United States Patent
Davoudi et al.

(10) Patent No.: US 8,278,898 B2
(45) Date of Patent: Oct. 2, 2012

(54) AUTO-TUNING POWER SUPPLY

(75) Inventors: Ali Davoudi, Champaign, IL (US);
Mark David Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 368 days.

(21) Appl. No.: 12/651,581

(22) Filed: Jan. 4, 2010

(65) Prior Publication Data

US 2010/0207594 A1    Aug. 19, 2010

Related U.S. Application Data

(60) Provisional application No. 61/152,495, filed on Feb. 13, 2009.

(51) Int. Cl.
*G05F 1/00* (2006.01)
(52) U.S. Cl. .................................................. 323/283
(58) Field of Classification Search .............. 323/222, 323/223, 271, 282, 283, 284, 285
See application file for complete search history.

(56) References Cited

U.S. PATENT DOCUMENTS

| | | | |
|---|---|---|---|
| 7,548,048 B2 * | 6/2009 | Chang | 323/283 |
| 2004/0227497 A1 * | 11/2004 | Asanuma et al. | 323/283 |
| 2008/0054869 A1 * | 3/2008 | Chang | 323/283 |
| 2009/0009148 A1 * | 1/2009 | Philbrick | 323/282 |

* cited by examiner

*Primary Examiner* — Nguyen Tran
(74) *Attorney, Agent, or Firm* — William B. Kempler; Wade J. Brady III; Frederick J. Telecky, Jr.

(57) ABSTRACT

An apparatus for and method of automatically tuning a voltage regulation control loop for a digitally controlled switch mode power supply is provided. The method includes determining a frequency response of the power stage and calculating an open loop transfer function from the frequency response. A correlated metric is defined based at least in part on the open loop transfer function, wherein the correlated metric is correlated to an expected disturbance in regulated output voltage from the digitally controlled switch mode power supply due to a change in load. New values for the open loop transfer function are calculated for a range of controller compensation parameters to minimize the correlated metric. These values are then applied to the digital controller for use in controlling the power supply.

20 Claims, 11 Drawing Sheets

AUTO-TUNING POWER SUPPLY

RELATED APPLICATION(S)

This application claims the benefit of U.S. Provisional application No. 61/152,495, filed Feb. 13, 2009, which is incorporated by reference in its entirety herein.

TECHNICAL FIELD

This invention relates generally to power supplies and more specifically to switch mode power supplies.

BACKGROUND

Switch-mode power-supply (SMPS) converters find use in a wide variety of applications, ranging from providing a fraction of a milliwatt of power in on-chip power management applications to providing hundreds of megawatts of power in municipal power systems. All of these applications require efficient and cost-effective static and dynamic power regulation over a wide range of operating conditions. An analog or digital controller closes the feedback loop around the switching converter and actively controls the on/off states of the power semiconductor devices to achieve input or output regulation.

For example, in FIG. 1, a power stage 105 of a power supply provides a voltage out. The voltage out is provided as a feedback signal to a comparator 110 that compares the voltage out to a reference signal and outputs an error signal. The error signal indicates how the voltage out differs from a target value indicated by the reference signal. An analog to digital converter 115 converts the error signal into a digital error signal processed by a digital compensator 120. The digital compensator 120 determines operating parameters for the power stage 105 based on the error and provides controlling signals to a digital pulse width modulator 125. The digital pulse width modulator 125 controls the operation of the power stage based on the controlling signals from the digital pulse width modulator 125.

Over the past few decades, digital controllers in the form of digital-signal processors (DSPs), microcontrollers, and field-programmable gate arrays (FPGAs) have grown in use in a variety of applications. Digital controllers rely on system or power supply design information to allow for accurate control of the power supply in response to feedback information from the power supply. Digital controllers, however, also introduce certain variables to the system including feedback quantization, control effort quantization, and delays for sampling the feedback information and calculating the control effort. To control these variables, power supplies and the digital controllers for the power supplies are typically modeled to allow designers to prepare operating parameters for each particular system.

In various applications, the digital controller should be tuned to achieve a desired dynamic performance including a fast dynamic response, minimum transients, and a stable closed-loop with a maximum bandwidth, minimum output impedance, and desired phase margin. Previous controllers, however, required user manipulation and input when creating mathematical models of the power supply, which impeded real time reactions to changing conditions for the power supply. For example, power-distribution systems containing multiple-power sources may experience dynamic performance degradation and even instabilities caused by uncertainties in the system parameters and interactions between different power modules.

SUMMARY

Generally speaking, pursuant to these various embodiments, an apparatus for and method of automatically tuning a voltage regulation control loop for a digitally controlled switch mode power supply is provided. The method includes determining a frequency response of the power stage of the digitally controlled switch mode power supply. An open loop transfer function is calculated from the frequency response, and a correlated metric is defined based at least in part on the open loop transfer function, wherein the correlated metric is correlated to an expected disturbance in regulated output voltage from the digitally controlled switch mode power supply due to a change in load. New values for the open loop transfer function are calculated for a range of controller compensation parameters to minimize the correlated metric. These values are then applied to the digital controller for use in controlling the power supply.

So configured, previous knowledge of the system parameters is not required to configure the digital controller. Instead, the digital controller's coefficients are automatically chosen to minimize the output impedance and maximum bandwidth of the power supply while preserving system stability by guaranteeing the phase margin. Typically, no external connections to the power supply are required, thereby allowing the process to be used late in the power supply manufacturing process. These and other benefits may become clearer upon making a thorough review and study of the following detailed description.

BRIEF DESCRIPTION OF THE DRAWINGS

The above needs are at least partially met through provision of the auto-tuning power supply described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 2:
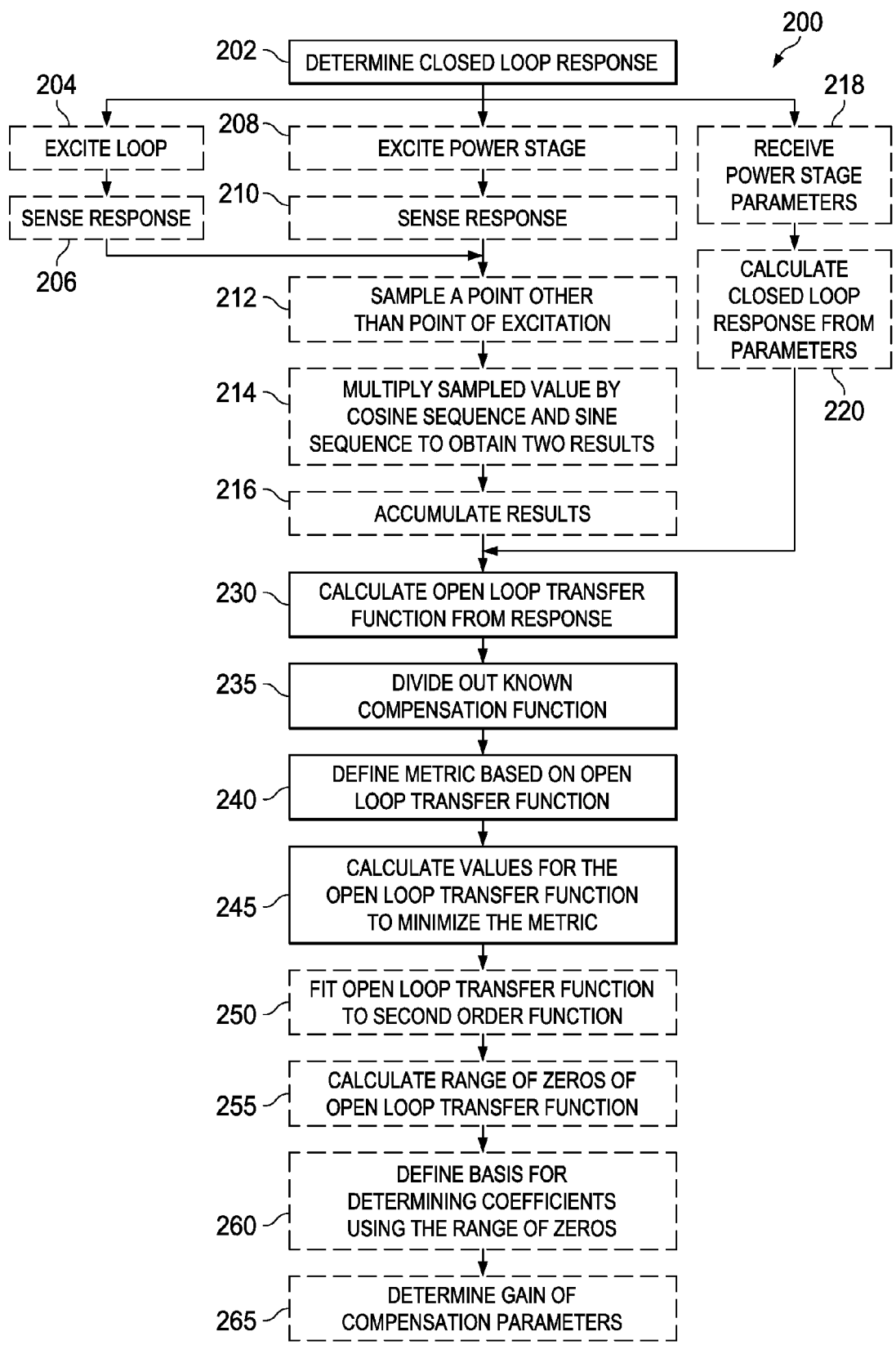
FIG. 2 comprises a flow chart of a method of auto-tuning as configured in accordance with various embodiments of the invention.

Referring now to the drawings, and in particular to FIG. 2, an illustrative process that is compatible with many of these teachings will now be presented. A method 200 of automatically tuning a voltage regulation control loop for a digitally controlled switch mode power supply includes determining 202 a frequency response of a power stage of the digitally controlled switch mode power supply. As used herein, the frequency response includes the product of the transfer function of at least substantially each circuit around the loop. By one approach, determining the frequency response includes exciting 204 a control loop of the digitally controlled switch mode power supply by a digital controller with a series of synthesized sine wave signals and sensing 206 a response thereto with the digital controller, the response comprising a frequency response. By one approach, the series of synthesized sine wave signals are provided by stepping through a sine table stored in a memory. By another approach, determining the frequency response includes exciting 208 the power stage when the power stage is disconnected from a compensator by applying a series of synthesized sine wave signals combined with an average duty cycle of the power stage and sensing 210 a response thereto with a digital controller, the response comprising a frequency response.

Sensing 206 and 210 the response to the series of synthesized sine wave signals, in one approach, includes sampling 212 a point in the control loop other than a point of excitation by the series of synthesized sine wave signals. In the approach of exciting the power stage when it is disconnected from the compensator, the sampling can occur at the first digital component of the digital controller. The method 200 then includes multiplying 214 a value at the point by a synthetic cosine sequence to obtain a first result and by a synthetic sine sequence to obtain a second result and accumulating 216 the first result and the second result, for example, through a discrete Fourier transform.

By another approach, determining the frequency response includes receiving 218 power stage parameters and calculating 220 the frequency response of the power stage from the power stage parameters. The power stage parameters may be obtained through any method known in the art. In one example, the digital controller is configured to receive the power stage parameters through software designed to prompt a user of the system to input various parameters relating to the design of the power stage. Such software to receive the parameters is within the skill of one skilled in the art.

Example approaches to the excitation, sensing, and calculation steps will be described with reference to FIG. 3, which shows a block diagram of an example switch mode power supply with a power stage 305 and controller compensator 310. The excitation signal may be applied at one or more points in the control loop. A controller 320 controls the excitation signal and the sensing process. The excite circuit 324 and sensing circuit 328 of the controller 320 are known in the art with an example implementation described below. The excite circuit 324 can be connected to provide the excitation at various points of the control loop, and the sensing circuit 328 can be connected to sense the response at various points of the control loop. These connections may be direct electrical connections as known in the art whereas in FIG. 3 the connections are shown logically.

Figure 1:
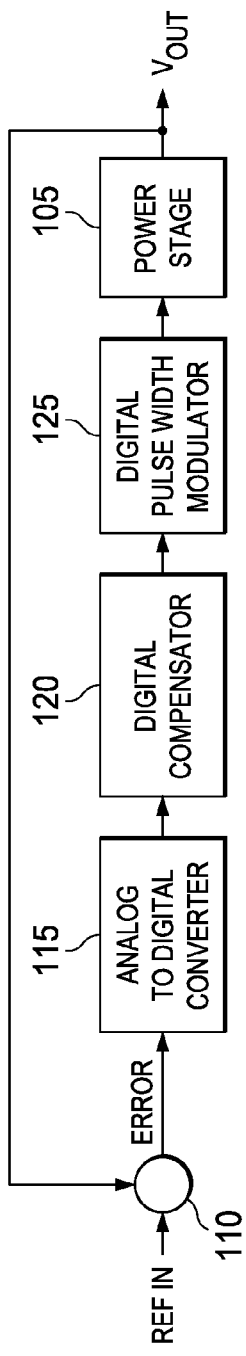
FIG. 1 comprises a block diagram of an example prior art power supply with a digital controller.
Figure 3:
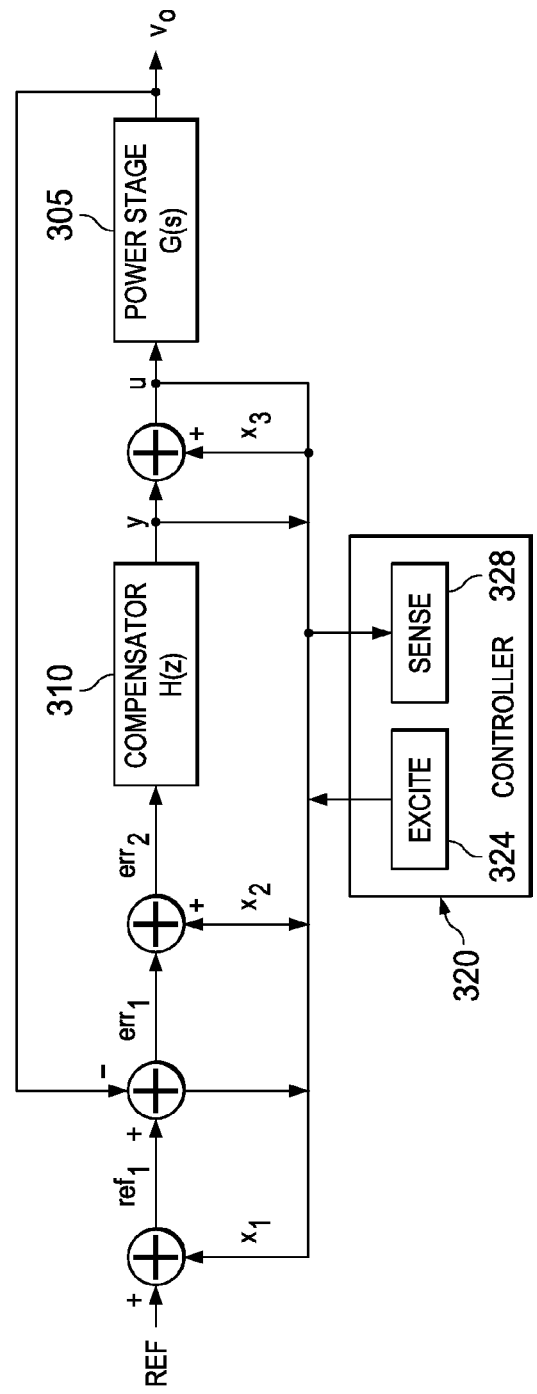
FIG. 3 comprises a block diagram of an example power supply with a digital controller as configured in accordance with various embodiments of the invention.

In the example of FIG. 3, the excitation signal may be applied at the setpoint reference point x1, at the error signal point x2, or at the control effort point x3. For example, if the excitation signal is added at the setpoint reference point x1, the excitation signal is added to the reference signal ref that is provided to determine the error of the power stage output voltage Vo. Depending on the location of the control loop excitation, various points of the control loop may be sensed to obtain the frequency response. Table One details locations of measuring the frequency response based on the location of excitation.

TABLE ONE

| Location of Excitation | Location of Measured Response | Open Loop Transfer Function |
| --- | --- | --- |
| setpoint reference (x1) | err1 or err2 | $\frac{x_1}{err_1} - 1$ or $\frac{x_1}{err_2} - 1$ |
| setpoint reference (x1) | y or u | $H(z)\frac{x_1}{y} - 1$ or $H(z)\frac{x_1}{u} - 1$ |
| error signal (x2) | err1 | $\frac{-err_1}{x_2 + err_1}$ |
| error signal (x2) | err2 | $\frac{x_2}{err_2} - 1$ |
| error signal (x2) | y or u | $H(z)\frac{x_2}{y} - 1$ or $H(z)\frac{x_2}{u} - 1$ |
| control effort (x3) | err1 or err2 | $1 - \frac{1}{H(z)}\frac{x_3}{err_1}$ or $1 - \frac{1}{H(z)}\frac{x_3}{err_2}$ |
| control effort (x3) | y | $\frac{y}{y + x_3}$ |
| control effort (x3) | u | $1 - \frac{x_3}{u}$ |

In this example, err1, err2, u, and y refer to the signals present on the corresponding portions of the digitally controlled switch mode power supply of FIG. 3. One skilled in the art will recognize that this example can be extended to power supplies of other configurations. In this example, G(s) is the measured power stage transfer function of the power stage 305, and H(z) is the transfer function for the controller compensator 310.

With brief reference again to FIG. 2, an open loop transfer function is calculated 230 from the frequency response that is determined as described above. For the example of FIG. 3, Table One also shows the open loop transfer function that is calculated based on the particular combination of excitation location and location of measuring the frequency response. More specifically, the output impedance of the power supply can be described with the following equation:

$$Z_{OUT.CL}(f) = \frac{Z_{OUT.CL}(f)}{1 + G(f)H(f)}$$

where $G(f)H(f)$ is the open loop transfer function (represented as $T(f)$) and Z represents the impedance value. $G(f)$ is the measured power stage transfer function, and $H(f)$ is the compensator transfer function. The derivation of these functions will be described below. In the approach where the frequency response is calculated from received power stage parameters, $Z_{out}(OL)$ is a fixed property of the power stage wherein it is sufficient to minimize the factor $1/(1+G(f)H(F))$ to determine the frequency response.

Referring again to FIG. 2, The method then includes dividing 235 out a known controller loop compensation transfer function from the open loop transfer function and defining 240 a correlated metric based at least in part on the open loop transfer function. The correlated metric is correlated to an expected disturbance in regulated output voltage from the digitally controlled switch mode power supply due to a change in load.

By one approach, defining a correlated metric includes simulating the digitally controlled switch mode power supply based on a least squares fit model of a power stage of the digitally controlled switch mode power supply and a selected compensator and capturing root mean square (RMS) and peak to peak disturbance of a regulated output voltage of the model to a load step. In this approach, the metric is a weighted sum of the disturbance measures. For instance, calculating the cost metric of the time response metrics can use weights selected by the user through a computing device in communication with the controller device.

By another approach, defining a correlated metric includes evaluating a closed loop output impedance of the digitally controlled switch mode power supply. For example, minimizing the closed loop output impedance provides one approach to optimizing the compensator for the digitally controlled switch mode power supply. In one such approach, the correlated metric comprises a weighted sum of the closed loop output impedance at a minimum frequency measured, the closed loop output impedance at a frequency at which the open loop output impedance is a maximum, the closed loop output impedance at a frequency at which the open loop output impedance is a maximum, and an RMS of the closed loop output impedance over a range of frequencies at which the open loop output impedance is evaluated.

After defining the correlated metric, the method 200 includes calculating 245 new values for the open loop transfer function for a range of controller compensation parameters to minimize the correlated metric. In one approach, the method 200 includes determining a plurality of open loop transfer functions by selecting a range of values for zeros of a controller compensator equation and determining a gain of the controller compensator equation at each instance of controller zeros. In one example of this approach, the method includes fitting 250 the open loop transfer function to a second order transfer function using a least square system identification of the open loop transfer function and calculating 255 a range for zeros based on dominant second order poles of the open loop transfer function. A basis for determining discrete-time filter coefficients using the range of zeros is defined 260, and a direct current (DC) gain of the controller compensation parameters is determined 265 by setting a resulting open loop gain equal to 1.0 at a frequency that gives a desired phase margin.

Although the flow chart of FIG. 2 shows a specific order of implementation, it is understood that the order may differ from that which is depicted, depending upon various factors such as, for example, the time it takes for various circuits to complete various tasks, etc. For example, the order of two or more blocks may be scrambled relative to the order shown. Also, two or more blocks shown in succession may be executed concurrently or with partial concurrence. It is understood that all such variations are within the scope of the invention.

Figure 4:
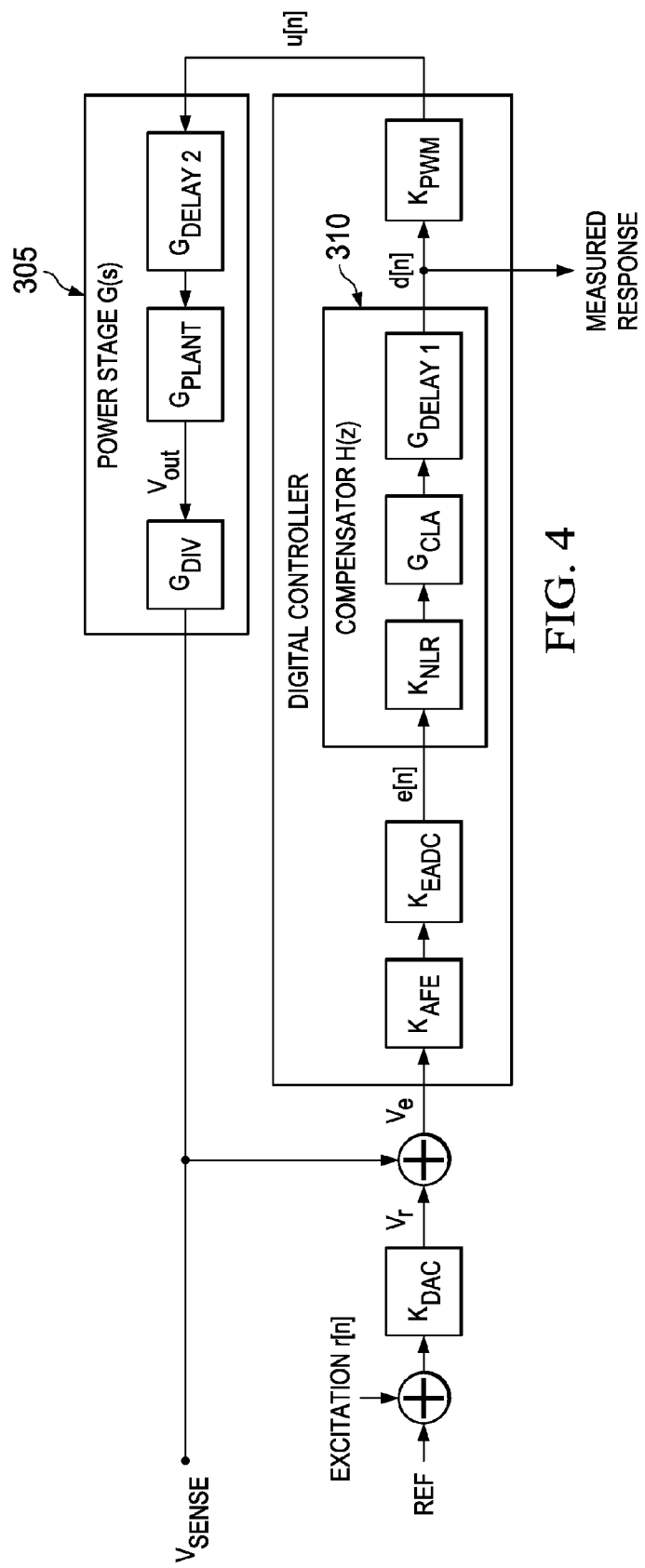
FIG. 4 comprises a block diagram of an example power supply with a digital controller as configured in accordance with various embodiments of the invention.

This process can be explained further with reference to FIG. 4, which shows a closed-loop block diagram for a digitally controlled switch mode power supply that first generates an analog error voltage and then digitizes that voltage to calculate the pulse width modulation (PWM) control effort, in other words the signals used to control the power stage 305 of the power supply. For this system, the total open-loop gain or transfer function is $T(s)=G(s)\times H(s)$. In this example, the closed-loop gain for a signal passing from the PWM control effort, u, to the sensed output voltage, Vsense, is $Vsense/u = G(s)/[1+G(s)\times H(s)]$. The contributing factors to the closed-loop system are itemized in Table Two.

TABLE TWO

| | |
|---|---|
| $K_{AFE}$ | Analog front-end gain |
| $K_{EADC}$ | Error ADC gain in Least Significant Bit/volt |
| $K_{NLR}$ | Nonlinear boost gain |
| $G_{CLA}$ | Control-law accelerator (CLA) (digital compensator) Gain |
| $G_{Delay1}$ | Total sampling and CLA computational delay |
| $K_{PWM}$ | PWM gain in duty/LSB |
| $G_{Delay2}$ | On-time and any delay to multiple power stages driving Vout |
| $G_{Plant}$ | Transfer function from the time location of the falling edge of the PWM signal to Vout of the power stage |
| $G_{Div}$ | Divider network transfer function |

To determine the frequency response of the power supply, and from that, determine the stability margin of the system, the dynamic gain for each block of the system is defined according to the skill of one in the art. Once the transfer function for each block is defined, the standard measure of stability can be applied where the gain margin is the inverse of the magnitude of the open-loop gain, expressed in dB, at the frequency where the phase of the open-loop gain is 180 degrees and the phase margin is the phase of the open-loop gain, expressed in degrees, where the magnitude of the open-loop gain is 1.0 (0 dB).

One approach to determining what compensation to apply to a switch mode power supply is to express the total open loop gain, $T(s)=G(s)\times H(s)$, and plot the magnitude and phase of the loop gain as a Bode plot. From the Bode plot, the stability metrics of phase margin and gain margin can be determined and adjustments to the compensation made until the desired metrics are obtained. Because most power engineers are familiar with the behavior of the total loop gain as the gain and compensating zeros are changed, it is advantageous to first define the compensation as a continuous-time transfer function with specified gain, zeros, and poles. Then this continuous-time transfer function is transformed to the discrete-time domain to determine the discrete filter coefficients. The following discussion illustrates one approach to defining these functions.

In this example, the compensator transfer function can be represented in the frequency domain (s) as:

$$H(s) = K_{DC} \frac{\left(\frac{s}{\omega_{z1}} + 1\right)\left(\frac{s}{\omega_{z2}} + 1\right)}{s\left(\frac{s}{\omega_{p2}} + 1\right)},$$

where $K_{DC}$ is the digital controller direct current gain, s represents the zeros of the equation or roots of the polynomial, and w represents the poles of the equation. If the zeros are complex, the equation can be written as $$H(s) = K_{DC} \frac{\frac{s^2}{\omega_r^2} + \frac{s}{\omega_r Q} + 1}{s\left(\frac{s}{\omega_{p2}} + 1\right)}.$$

Either of these two equations can describe the continuous-time prototype controller. If the compensating zeros are complex, the second equation is a more convenient form.

Once the design parameters of $\omega_r$, Q, $\omega_{p2}$, and $K_{DC}$ are determined, the continuous-time transfer function is mapped to the z-domain using the bilinear transformation:

$$s = 2F_s \frac{z-1}{z+1}.$$

Here $F_s$ is the sampling frequency used by the compensating digital filter. This is typically the switching frequency. This mapping results in the following relationship between the continuous time design parameters and the discrete-filter coefficients:

$$b_0 = K_{DC}\left(\frac{\omega_p}{2F_s + \omega_p}\right)\left(\frac{2F_s}{\omega_c^2} + \frac{1}{\omega_c Q} + \frac{1}{2F_s}\right);$$

$$b_1 = K_{DC}\left(\frac{\omega_p}{2F_s + \omega_p}\right)\left(\frac{-4F_s}{\omega_c^2} + \frac{1}{F_s}\right);$$

$$b_2 = K_{DC}\left(\frac{\omega_p}{2F_x + \omega_p}\right)\left(\frac{2F_s}{\omega_c^2} - \frac{1}{\omega_c Q} + \frac{1}{2F_s}\right);$$

$$a_1 = \frac{-4F_s}{2F_s + \omega_p}; \text{ and}$$

$$a_2 = \omega_p\left(\frac{2F_s - \omega_p}{2F_s + \omega_p}\right).$$

To evaluate the frequency response of the compensator as part of the total open loop gain, the discrete-time transfer function in the discrete time domain z is evaluated by substituting $z=e^{j\omega T}$, where T in this equation is the sample period for the compensating digital filter. This approach avoids distortions introduced when doing the bilinear mapping from continuous time to discrete time. The distortions occur because the bilinear transformation maps the entire left-half s-plane into the unit circle of the z-domain. As a result, the specified continuous-time transfer function will differ slightly from the discrete-time transfer function at frequencies near the Nyquist frequency. This distortion does not cause a problem as long as the Bode plot and the stability metrics derived from it are constructed using the discrete-time transfer-function polynomial and the substitution of $z=e^{j\omega T}$, which assumes there is an exact mapping between the continuous and discrete-time domains. Accordingly, the equivalent transfer function in the discrete time domain (z) is:

$$H(z) = K_{DC} \frac{b_0 z^2 + b_1 z + b_2}{z^2 + a_1 zs + a_2}.$$

In one approach, to provide auto-tuning of the example power supply of FIG. 4 using the above equations, a synthesized digital-sinusoidal signal is injected into the closed-loop system, and the response to that excitation is measured at another point in the loop. The open-loop gain is calculated from this measured closed-loop response. Repeating this over a range of frequencies provides the data necessary to create the Bode plot for the system. FIG. 4 shows the location of the injected signal, r[n], and of the measurement points, e and d, of this example.

The transfer function from the reference to the output voltage can be expressed for this example as $$\frac{v_{out}}{ref} = \frac{K_{DAC} T(z)}{1 + T(z)}$$

where $T(z) = K_{AFE} H(z) K_{PWM} G_{Delay} G_{Plant} G_{Div}$. The transfer function from the excitation x[n] to d[n] is:

$$\frac{d(z)}{x(z)} = \frac{K_{DAC} K_{AFE} H(z)}{1 + T(z)}.$$

This equation is then solved for $G_{Plant}$:

$$G_{Plant} = \frac{1}{K_{PWM} G_{Delay} G_{Div}} \times \left(\frac{K_{DAC} \times x}{d} + \frac{1}{K_{AFE} H(z)}\right).$$

Figure 7:
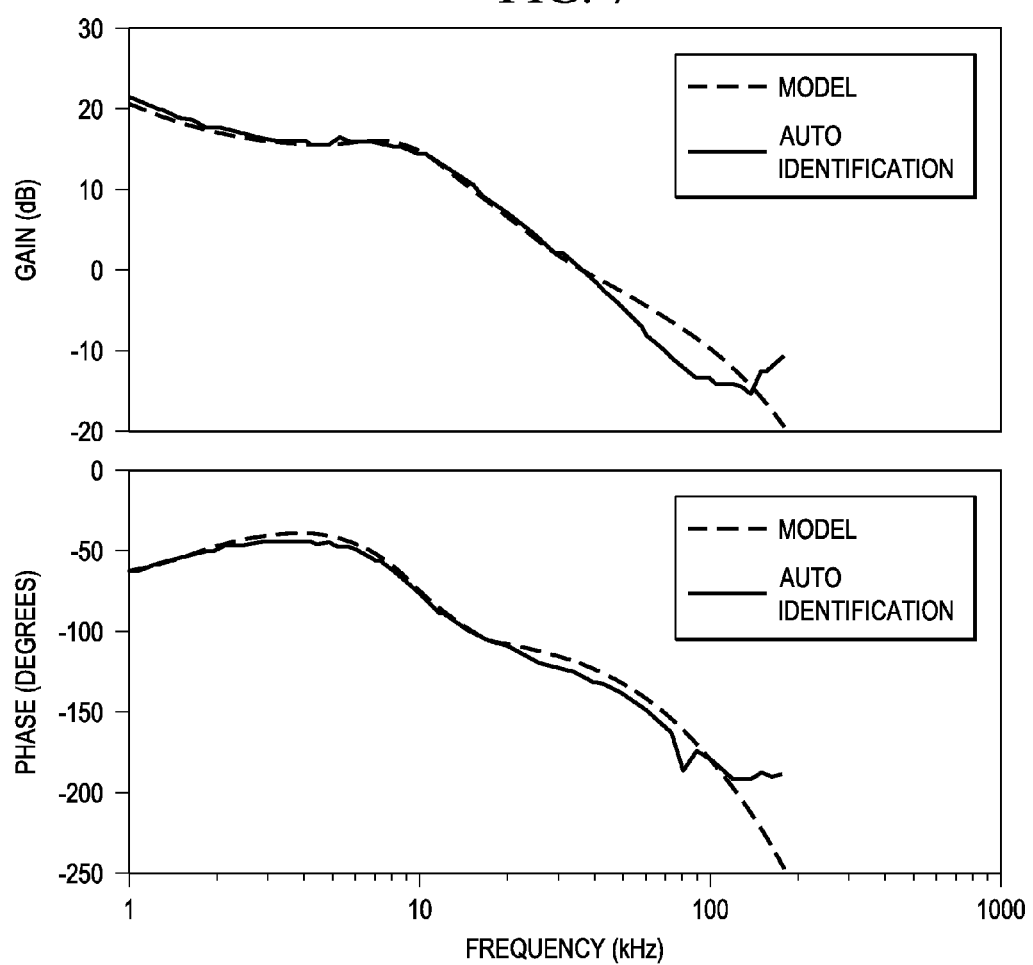
FIG. 7 comprises a Bode plot of the gain and phase versus frequency of a model and an automated identification of the example circuit of FIG. 6.

To generate the excitation signal in this example, a table look-up technique is used. The table contains a sequence for one period of the sine wave, and a pointer is stepped through the table at different rates to generate each excitation frequency. To measure the response, the same table is used to generate a cosine and a sine sequence. These two sequences are multiplied by the response vector, d[n], and summed to obtain a complex estimate of the response at the excitation frequency. This is repeated at each frequency for which a measurement is desired. The Bode plot for the system is generated from the complex estimate of the response (see FIG. 7).

Because most of the gains in the system are digital, such as the compensator, the digital PWM, the computational delay, and the like, this technique produces an accurate estimate of the transfer function of the power stage. So configured, the automatic identification of the estimate response can be used to make decisions about the optimal compensation of the loop.

Traditional controllers usually require redesign or retuning during development to account for wide variations in the power-supply parameters and operating conditions. Most prior digital auto-tuning techniques try to shape the frequency response of the closed-loop gain. In this case, the controller coefficients can be tuned to achieve the desired phase and gain margins and loop bandwidth.

Figure 5:
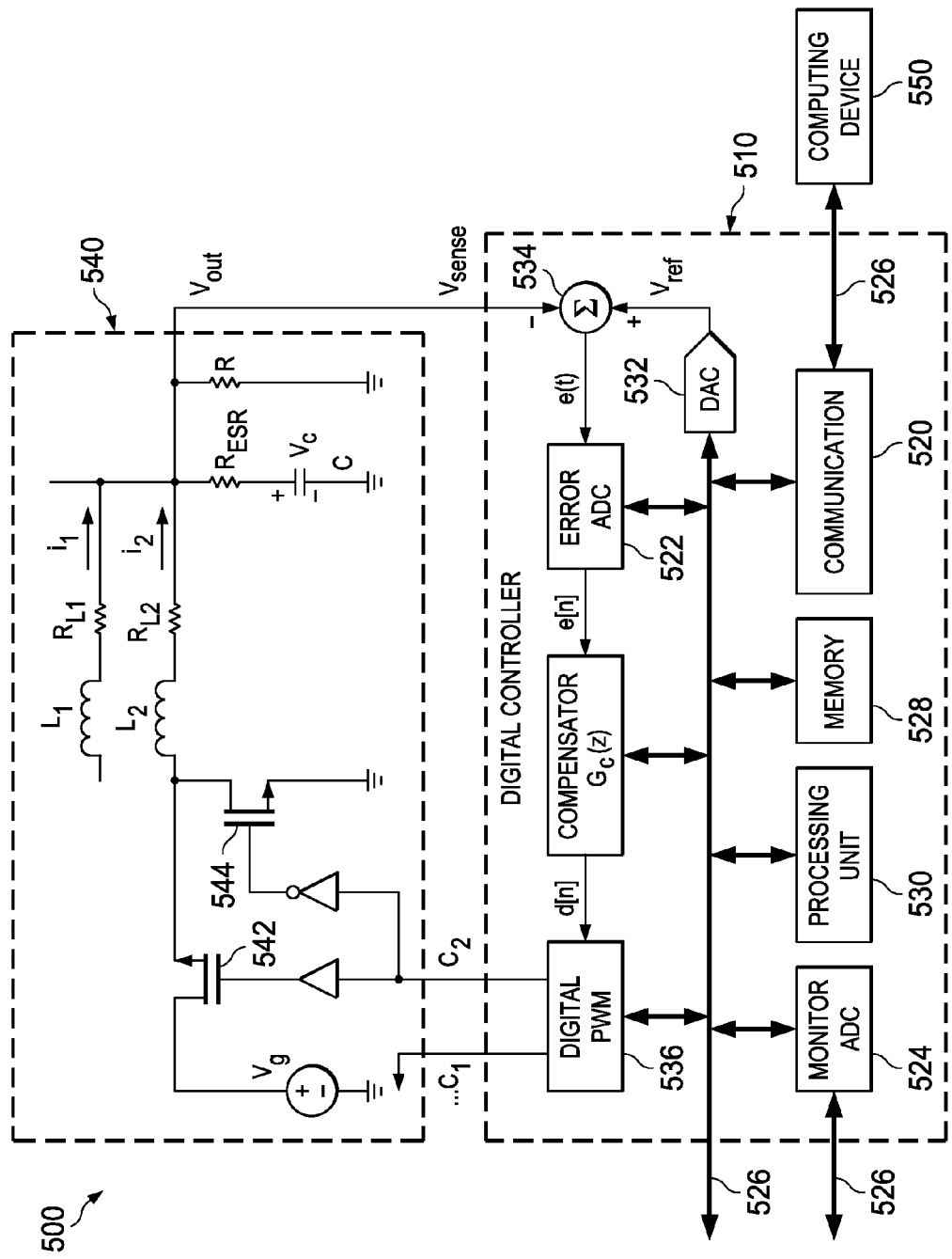
FIG. 5 comprises a circuit diagram of an example power supply with a block diagram of an example a digital controller as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided. FIG. 5 shows digitally controlled switch mode power supply 500 including a block diagram of an example advanced digital controller 510 having a connector 534 connected to receive a voltage output Vout from the switch mode power supply converter 540. The digital controller 510 closes the feedback around a switch mode power supply converter 515 and is connected to provide a controller signal to the switch mode power supply converter 540, and to determine a frequency response of the switch mode power supply converter 540. By one approach, the digital controller 510 is configured to be in communication with an input and an output of a power stage of the switch mode power supply converter to excite the power stage and sense a response thereto.

Such a digital controller 510, because it is implemented in a digital silicon technology, usually includes a standard communication block 520 configured to send and receive signals with a separate computing device 550; general-purpose analog to digital converters (ADCs) 522 and 524; digital inputs/outputs (I/Os) 526; memory 528 operatively connected to a processing unit (such as a microcontroller) 530 that handles programming, communication, diagnostics, power management, and the like. Those skilled in the art will recognize and appreciate that such a processor can comprise a fixed-purpose hard-wired platform or can comprise a partially or wholly programmable platform. All of these architectural options are well known and understood in the art and require no further description here. The processing unit 530 is operatively connected to the digital pulse width modulation circuitry 536 which is configured to apply a pulse width modulated control signal to the switch mode power supply 540.

So configured, a digital controller 510 regulates the output voltage and can perform complex sequencing and can monitor key parameters like average current and power for the host system. Moreover, a user interface for a computing device 550 that can communicate with the digital controller 510 can provide a tool to assist the auto-tuning process such as a software interface to receive input parameters from a user or other input source. For instance, auto-tuning based on frequency response can use the simulation results. The auto-tuning process can use criteria such as crossover frequency, phase margin, gain margin, DC gain (the loop gain at 10 Hz), and the maximum closed-loop output impedance for frequency-response shaping. The desired value and the weight applied to each criterion can be set through the computing device. The computing device also can be configured to support time-domain criteria including settling time, overshoot, and undershoot. The computing device iterates the compensator coefficients to achieve the desired frequency response and time-domain simulation results. After evaluating the results, the final compensator coefficients are loaded into the device register of the controller 510. In this case, the operations of the processing unit 530 can be divided between the processing unit 530 at the digital controller 510 and the computing device 550 according to the skill of one in the art.

In this example, there are three specific blocks that enable the digital controller 510 to achieve the high-performance regulation requirements of an SMPS 515: the ADC 522 used to sample the error voltage (and an associated set point reference signal at the digital to analog converter (DAC) 532), the digital filter 534 that compensates the error signal, and the digital pulse width modulator (DPWM) 536 that converts the sampled, compensated error signal into the gate drive signals that control the power stage 540 through transistors 542 and 544. The remainder of the power stage 540 circuit comprises a power source Vg connected to the power stage 540 through one transistor 542 with a second transistor 544 connecting the power stage 540 to ground. Inductors L1 and L2 connected with resistors $R_{L1}$ and $R_{L2}$ work with a capacitor C to provide an output voltage across a resistor R as the output Vout of the power stage 540.

Those skilled in the art will recognize and understand that such an apparatus 510 may be comprised of a plurality of physically distinct elements as is suggested by the illustration shown in FIG. 5. It is also possible, however, to view this illustration as comprising a logical view, in which case one or more of these elements can be enabled and realized via a shared platform. It will also be understood that such a shared platform may comprise a wholly or at least partially programmable platform as are known in the art.

Because most digital controllers contain a serial interface, they generally can be configured from design software. This allows a computing device running the design software to perform much of the modeling of the system and calculating appropriate compensation for the switch mode power supply. Accordingly, in an additional approach, the functionality or logic described in FIG. 2 may be embodied in the form of code that may be executed in a separate processor circuit or in the processing unit 530. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. The code may be embodied in any known medium for storing code or instructions for use by a computing device such a tangible computer readable medium, for example a hard drive, read only memory, computer disk, flash memory, and the like. If embodied in hardware, each block may represent a circuit or a number of interconnected circuits to implement the specified logical function(s).

An example implementation of a digitally controlled switch mode power supply will be described with reference to FIG. 6, which shows the implementation of a two-phase buck converter using an integrated driver, a power MOSFET (DrMOS), and a UCD9240 digital-power POL-system controller. The signals CS.1 and CS.2 are used for current sharing within the UCD9240. The power-stage parameters are as follows: L1=L2=0.363 RL1=RL2=2.4 mΩ, Co=3×470+12× 47 µF, Resr=1 mΩ, Vin=10 V, Vout=Vref=1 V, fs=350 kHz, and H=0.8 (voltage-sense gain).

FIG. 5 shows a simplified block diagram of the UCD9240 digital controller. In the implementation of FIG. 6, the controller 510 of FIG. 5 incorporates a window-type error ADC 522 with analog front-end gain ($G_{AFE}$) and programmable gains of 1, 2, 4, and 8. The output of the error ADC 522 has a 6-bit signed-integer format. The resolution of the error ADC 522 equals 1 mV for $G_{AFE}$=8. The UCD9240 also provides a programmable reference using a 10-bit DAC 532. The resolution of the DAC 532 equals 1.6 mV in the range of 1.6 V. The sampling frequency of the error ADC 522 depends on the digital PWM switching frequency, Fsw. The sampling location during one switching period is programmable.

Figure 6:
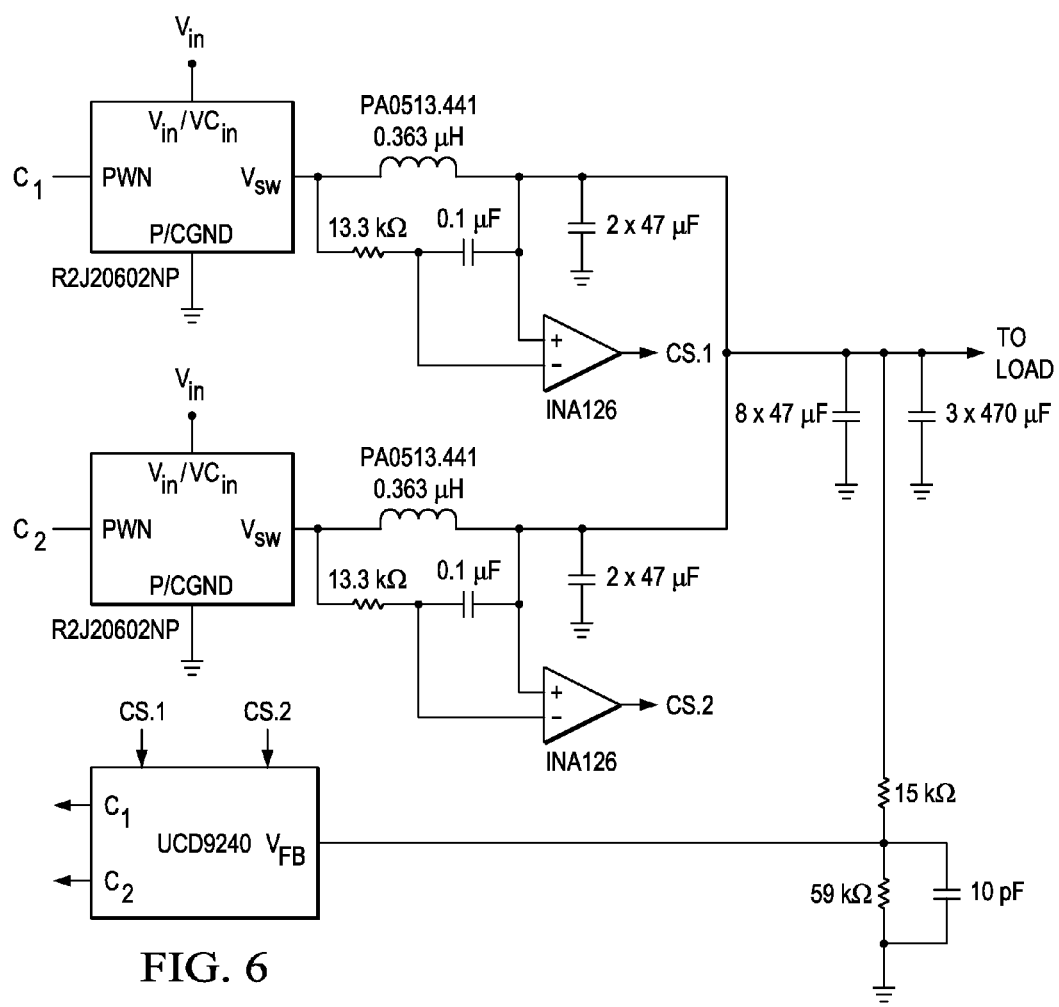
FIG. 6 comprises a circuit diagram of an example power supply with a digital controller as configured in accordance with various embodiments of the invention.

The UCD9240 of the example of FIG. 6 includes a high-resolution hybrid DPWM. The digital PWM implements a 4-bit ring oscillator. The clock frequency of the counter equals 250 MHz. Because of the hybrid nature of the PWM engine, however, the resolution of the duty cycle is actually 250 ps. The PWM engine uses a programmable switching frequency between 15 kHz and 2 MHz with 4-ns resolution. It also provides several outputs for synchronous rectification and supports programmable dead times with 250-ps resolution. The dead-time programmability of the DPWM module helps optimize efficiency in a synchronously rectified DC/DC converter. The input to the digital PWM consists of a signed 16-bit duty-cycle value from the compensator. The PWM-engine design ensures that for any programmed value of switching frequency, the maximum value of the duty cycle (7FFF hex) provides a 100% PWM output (always on). The controller is programmed or configured to perform auto-tuning on the circuit.

Still another example approach to auto-tuning includes the following:

1) Set the two poles of the compensator at the origin and at 20% of the switching frequency, Fsw. In this approach, the second pole, $F_{p2}$, must be between about 15% and 31.8% of Fs, so 20% is a reasonable setting.

2) Find the dominant 2nd order poles of the plant or power stage by doing least square system identification of the multiple-order plant model. This is done by fitting measured data to a transfer function consisting of a ratio of 2nd order polynomials. For a 2nd order low-pass system, the simplest system can be described as follows $$G(s) = \frac{K_{DC}}{\frac{s^2}{\omega^2} + \frac{s}{\omega Q} + 1}.$$

It is assumed that a measurement of G(s) consists of complex values $M_r(f) + jM_i(f)$ where $M_r$ is a vector of the real part of the measurement at each frequency and $M_i$ is a vector of the imaginary part of the measurement at each frequency. The G(s) equation can then be described as $$M_r(f) + jM_i(f) = \frac{K_{DC}}{-\frac{f^2}{f_c^2} + j\frac{f}{f_c Q_c} + 1}.$$

If we multiply both sides by the denominator we get $$-\frac{M_r}{f_c^2}f^2 + j\frac{M_r}{f_c Q_c}f + M_r - j\frac{M_i}{f_c^2}f^2 - \frac{M_i}{f_c Q_c}f + jM_i = K_{DC}.$$

This can be separated into two equations; one for the real part and one for the imaginary part. These equations can be described in terms of matrices as $$\begin{bmatrix} M_r \\ M_i \end{bmatrix} = \begin{bmatrix} M_r f^2 & M_i f & 1 \\ M_i f^2 & -M_r f & 0 \end{bmatrix} \cdot \begin{bmatrix} \frac{1}{f_c^2} \\ \frac{1}{f_c Q_c} \\ K_{DC} \end{bmatrix}.$$

Now the following variables are assigned to the quantities in these equations:

$$u = \begin{bmatrix} M_r \\ M_i \end{bmatrix}, A = \begin{bmatrix} M_r f^2 & M_i f & 1 \\ M_i f^2 & -M_r f & 0 \end{bmatrix}, \text{ and } x = \begin{bmatrix} \frac{1}{f_c^2} \\ \frac{1}{f_c Q_c} \\ K_{DC} \end{bmatrix}.$$

Then x is solved using the standard least square error equation $x = \text{inv}(A' \cdot A) \cdot A' \cdot u$. Once x is determined, the estimates of $f_c$, $Q_c$ and $K_{DC}$ are solved according to the following:

$$f_c = \sqrt{\frac{1}{x_1}}, \quad Q_c = \frac{\sqrt{x_2}}{x_2},$$

and $K_{DC} = x_3$. It turns out that the matrix $(A' \cdot A)$ can be badly scaled, resulting in poor numerical accuracy when its inverse is calculated. Accordingly the mean of each column in A is calculated and then each column is divided by that value to obtain a normalized matrix $$A_n = \begin{bmatrix} \frac{A_1}{E|A_1|} & \frac{A_2}{E|A_2|} & \frac{A_3}{E|A_3|} \end{bmatrix}.$$

The normalized least square error estimate then is $x = \text{inv}(A'_n \cdot A_n) \cdot A'_n \cdot u$, and the polynomial coefficients are calculated as $$f_c = \sqrt{\frac{E|A_2|}{x_2}}, \quad Q_c = E|A_2|\frac{\sqrt{A_2}}{x_2}, \text{ and } K_{DC} = \frac{x_3}{E|A_3|}.$$

2b) Another approach to finding the dominant 2nd order poles of the plant or power stage is look to a Bode plot for peaks that indicate the poles. For the case where Q is greater than 0.5 and finding $f_c$ is not desired, one can start with the following equation, where at the corner frequency $\omega_c$ the transfer function is $$G(j\omega_c) = \frac{K_{DC}}{-\frac{\omega_c^2}{\omega_c^2} + j\frac{\omega_c}{\omega_c Q_c} + 1} = jK_{DC}Q_c.$$

The Q of the plant can be estimated by finding the measured response at the lowest frequency and assign that to $K_{DC}$. Then the maximum value of the response can be found, and (assuming that Qc>0.5) the estimate of the Q is calculated as $$Q_c = \frac{\max(|G|)}{|G(f=\min)|}$$

where |·| is the magnitude function.

3) Find a range for the zeros of the compensator based on the identified poles of the plant. This approach sets that range as follows:

$F\text{plant}*20\% < F\text{zero} < F\text{plant}*110\%$ $Q\text{plant}*20\% < Q\text{zero} < Q\text{plant}*150\%.$ 4) Use the range for the continuous-time zeros defined above to define the bounds for a basis that determines the discrete-time filter coefficients and then sweep this basis when performing the tuning.

5) For each set of discrete-time zeros, find the open loop transfer function, given a nominal compensator DC gain, which will describe the open-loop phase.

6) Starting with the minimum evaluated frequency, find the first frequency where phase==(−180+phase_margin). Apply interpolation to find the open loop magnitude (gain) at this frequency. Divide the compensator numerator coefficients by this gain. This will cause the open loop magnitude to be 1.0 (0 dB) at this frequency and set the gain for the compensator.

7) With the open loop gain set based on phase margin, sweep through the open loop gain and test each frequency against the Nyquist criteria. If it fails the criteria, reject the design point. The Nyquist criteria in this case is: (1) The geometric distance of the complex gain value to the point −1+j0 must be greater than a defined value. In other words, the criteria=(min_dist−dist)/dist. (2) The open loop gain cannot encircle the −1+0j point. This is ensured by detecting each crossing of the x-axis and then rejecting the design if the number of crossings is odd.

8) Calculate the closed loop output impedance for this compensation, and define a $Z_{out}$ metric for the output impedance versus frequency. The present metric measures the attributes of the $Z_{out}$ curve set forth in Table Three.

TABLE THREE

| Attribute | Calculation | Weight |
|---|---|---|
| CL RMS value | Zrms = (Zcl' * Zcl)/length(Zcl)^0.5 | 2.00 |
| CL max magnitude | Zmax = max(abs(Zcl)) | 1.0 |
| CL max at OL max freq | [Zout_max, ixZo] = max(abs(Zout)); ZOLmax = abs(Zcl(ixZo)); | 2.0 |
| CL magnitude at min freq | Z0 = abs(Zcl(1)); | 100 |

9) Repeat for each set of zeros, keeping the filter coefficients for the best (lowest) metric.

In this example approach, the filter denominator is defined by a pole at the origin and a second pole, which is fixed at 20% of the switching frequency $F_{SW}$ such that the auto-tune algorithm will not affect the denominator coefficients. This leaves the three numerator coefficients to be adjusted by the algorithm. The three numerator coefficients are defined by the location of the two zeros and the DC gain of the compensator.

In this example, a pair of zeros is selected, and the numerator compensation coefficients are calculated using an arbitrary DC gain. Then, the total loop gain is calculated using these coefficients and the plant or power stage transfer function. This calculation of total loop gain provides the phase, which is independent of DC gain. A frequency can be picked on the phase curve that provides good phase margin. Then the DC gain of the compensator is adjusted to make the loop gain magnitude 0 dB (gain of 1.0) at that frequency. This uniquely defines the compensator, and this system can be compared to another with a different set of zeros by defining a performance metric.

The three numerator coefficients are defined by the DC gain and the location of the two zeros. To set the gain based on the desired phase margin, just two parameters are swept when searching for the optimum filter coefficients. In the continuous-time domain, those two parameters could be $F_{Z1}$ and $F_{Z2}$, or $F_Z$ and $Q_Z$. In the discrete-time domain several possible pairs of parameters are available. Because the function of these parameters is to define the set of numerator coefficients, this defines basis of the algorithm.

Figure 8:
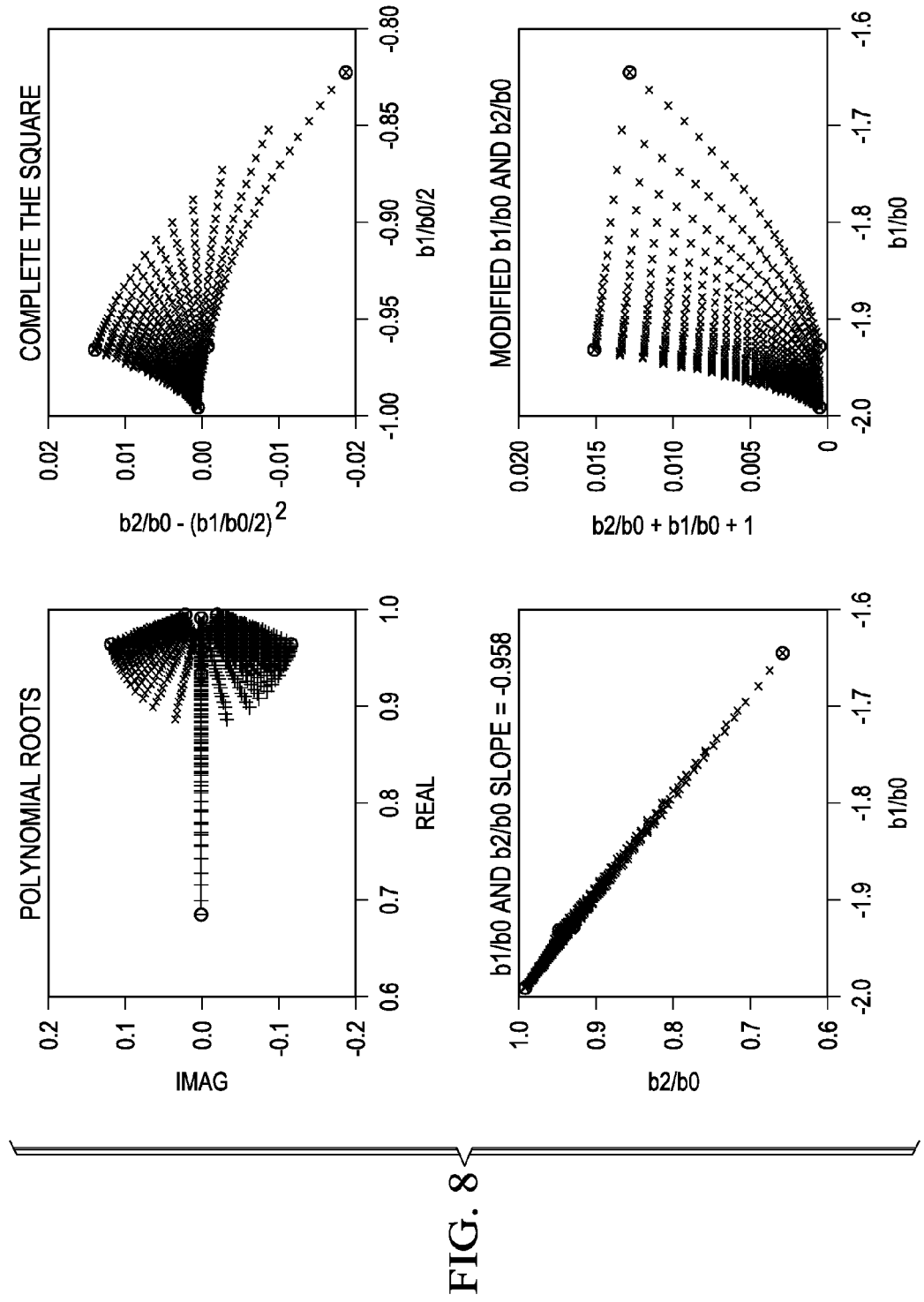
FIG. 8 comprises four plots of four possible basis pairs for searching for compensation parameters in one example auto-tuning approach having $F_{plant}=9.0$ kHz and $Q_{plant}=1.5$.

FIG. 8 shows several possible basis pairs that can be optionally used in searching for an optimal compensation. In each case, a range of values for the continuous-time design parameters $F_Z$ and $Q_Z$ are used to calculate a range of values for the possible basis. Because the goal is to sweep the two parameters in this example, the more rectangular and evenly spaced the plotted basis is, the better. The first (NW) plot is the actual complex roots of the compensation filter numerator polynomial. The second (NE) plot is the numerator polynomial expressed in "completing the square" form:

$$\text{num}(z) = b_0 \lfloor (z+z_0)^2 + k \rfloor$$

$$\text{where } z_0 = \frac{b_1}{2b_0} \text{ and } k = \frac{b_2}{b_0} - \left(\frac{b_1}{2b_0}\right)^2.$$

The third (SW) plot is simply the normalized $b_1$ and $b_2$ filter coefficients and the fourth (SE) plot is the normalized $b_1$ filter coefficient and a rotated version of the $b_2$ filter coefficient. The desired basis is fairly rectangular and evenly spaced over the swept range. Given this goal, the fourth plot shows the best basis. It is calculated as follows for this example:

$$x_1 = \frac{b_1}{b_0} \text{ and } x_2 = \frac{b_2}{b_0} + x1 + 1.$$

To gain some insight, $x_2$ can be rewritten as $$x_2 = (b_0 + b_1 + b_2)\frac{1}{b_0}.$$

Now $(b_0+b_1+b_2)$ is the integrator gain when expressing the filter in terms of a proportional-integral-derivative (PID) controller gains such that this basis is the normalized middle coefficient and the scaled integrator gain.

Once a set of zeros is selected using the basis described above, the frequency at which the desired phase margin is achieved is found. Then the compensator gain is modified by adjusting $b_0$ so that the open loop gain is 1.0 at this frequency. Getting this compensator gain correct helps the routine's interpolation to find the frequency for the desired phase margin and to find the gain at that frequency.

Figure 9:
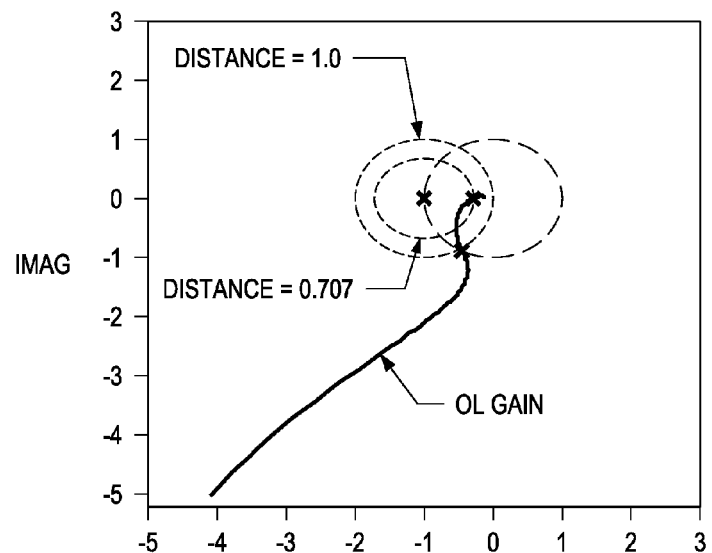
FIG. 9 comprises a Nyquist plot used to test stability for an example auto-tuning approach.

At this point the compensator coefficients are completely defined. The next step is to test this design point for stability by testing against the Nyquist criteria. FIG. 9 shows the Nyquist plot. The design point is rejected if the open loop gain curve encircles the −1+j0 point on the graph.

Figure 10:
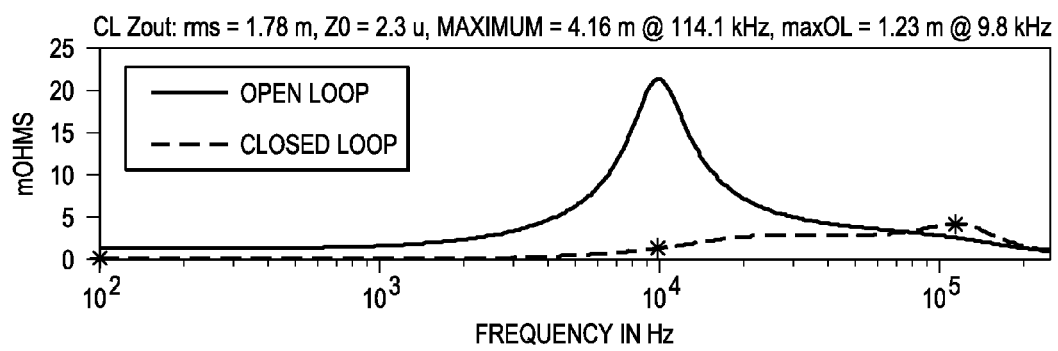
FIG. 10 comprises a typical output impedance curve for an open loop and closed loop frequency response that can be used in one example auto-tuning approach.
Figure 11:
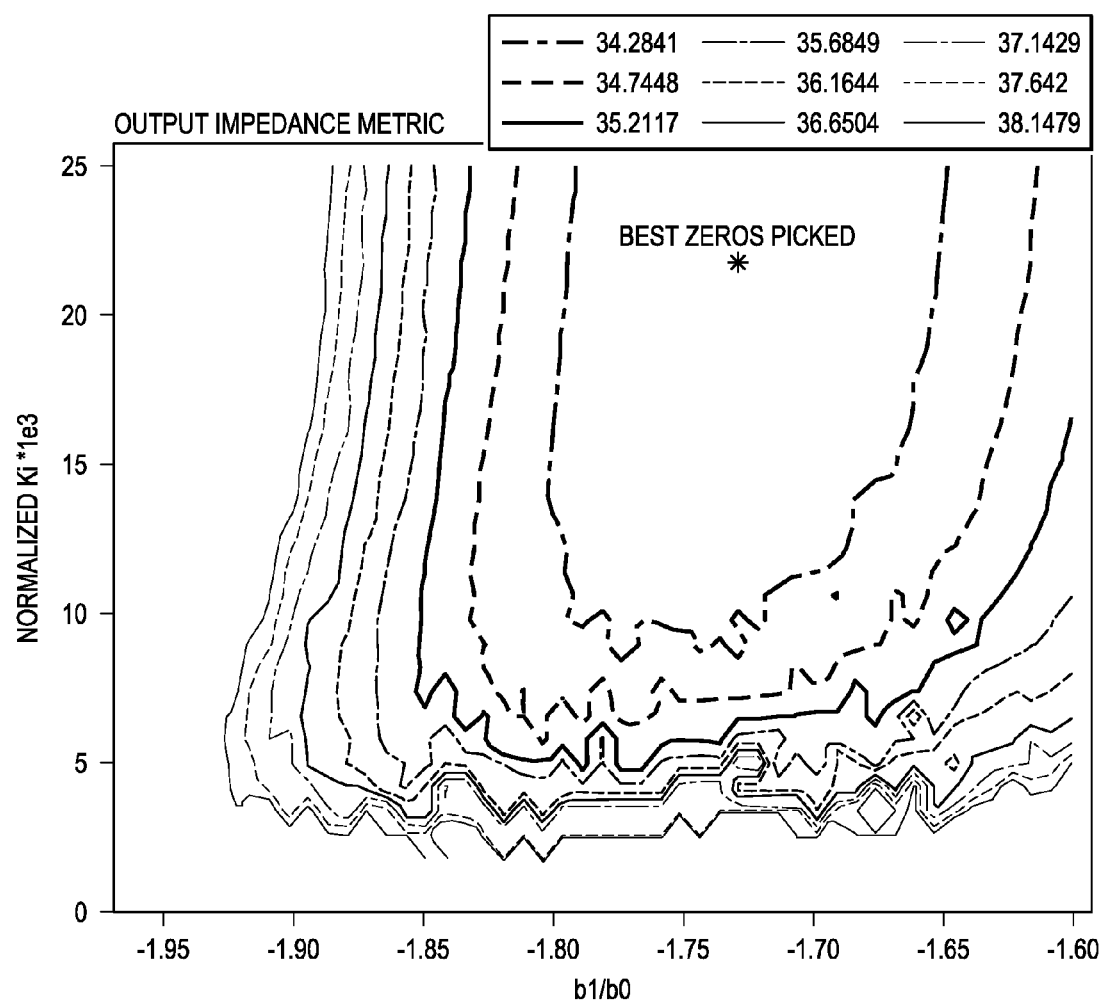
FIG. 11 comprises contour plot of the output impedance based performance metric for an example auto-tuning approach.
Figure 12:
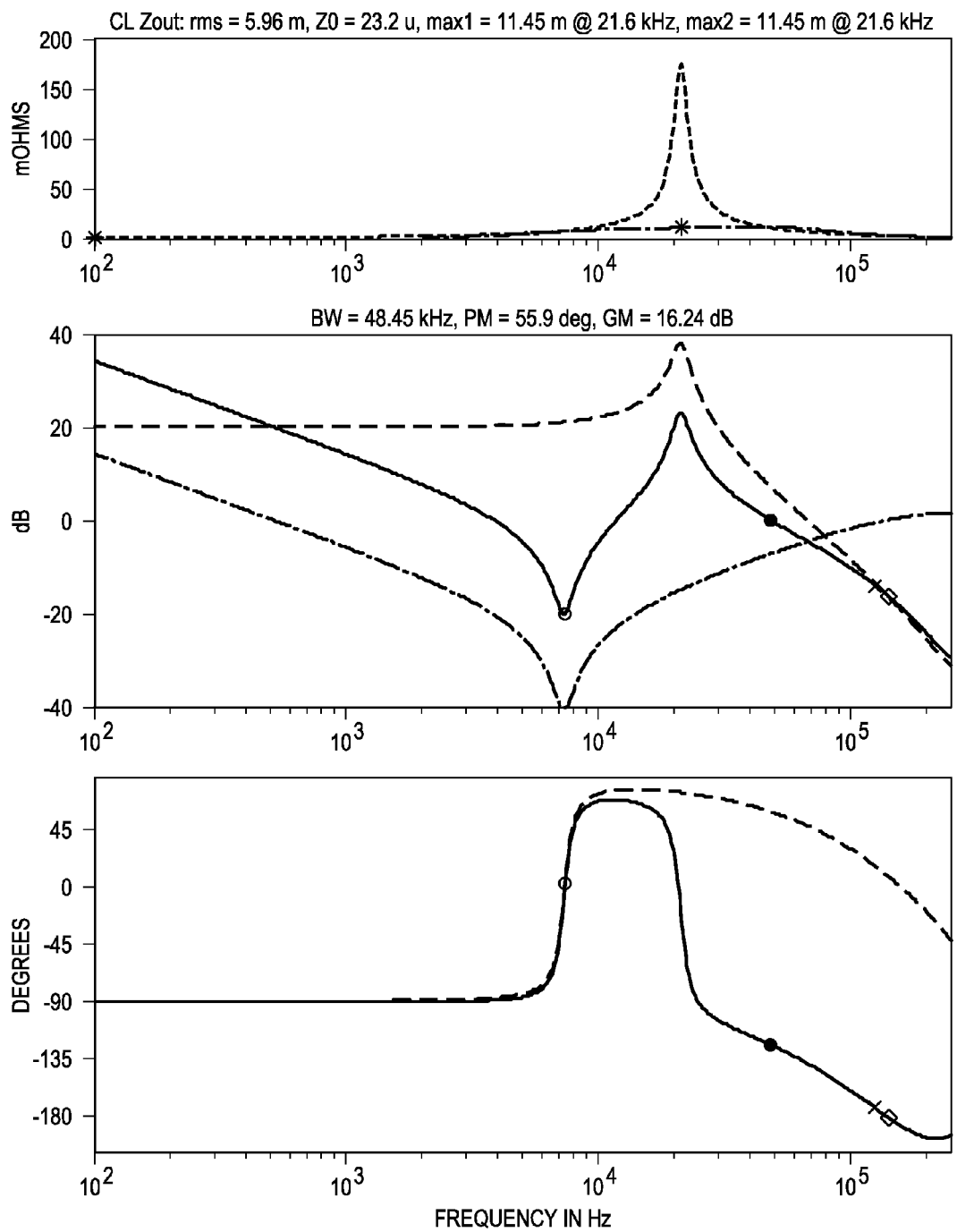
FIG. 12 comprises plots of the frequency response of impedance, gain, and phase in one example auto-tuning approach for an all ceramic cap design.
Figure 13:
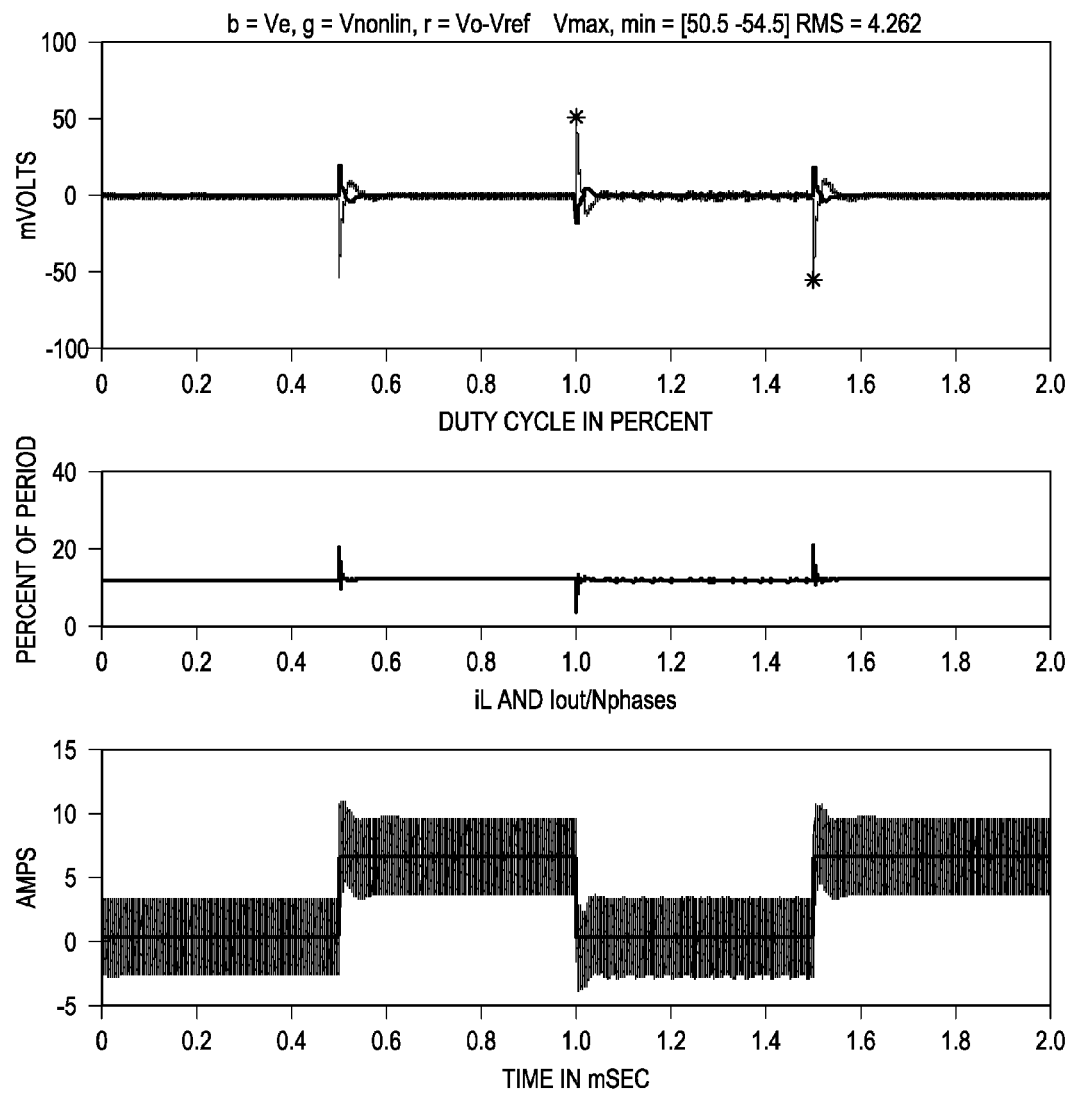
FIG. 13 comprises three plots transient response for the all ceramic cap design of FIG. 12.

In this example, the compensator gain is set to give a specified phase margin such that phase margin is not part of the performance metric. Given the desire to work with just the frequency model, the output impedance should be used as a metric. A good power supply has low output impedance, which makes the output voltage resistant to changes in load. Note that the output impedance varies with frequency and different frequency ranges account for different characteristics of the time-domain load step response. A typical output impedance curve is shown in FIG. 10. Based on empirical work with the frequency and time models, a metric is defined as follows:

$$\text{metric} = w_1(Z_{CL})_{RMS} + w_2|Z_{CL}|_{Max} + w_3|Z_{CL}|_{Max\ OL\ freq} + w_4|Z_{CL}|_{min\ freq}.$$

The calculation of each parameter and the weights used for this example are shown in Table Three above. The weighting is set so that each measure contributes roughly the same to the metric.

Because this example method uses just the small-signal model, the non-linear gain does not contribute to the solution other than setting the overall DC loop gain. By another approach, the computing device can be configured to provide three pre-set options for the handling non-linear (NLR) gain. In this approach, a user can select between no boost, medium boost, and aggressive boost as defined by Table Four when tuning the power supply.

TABLE FOUR

| Limits (LSBs) | No NLR boost | medium NLR boost | aggressive NLR boost |
|---|---|---|---|
| err > 4 | 1.0 | 1.5 | 2.0 |
| 4 > err > 3 | 1.0 | 1.25 | 1.75 |
| 3 > err > −3 | 1.0 | 1.0 | 1.0 |
| −4 > err > −5 | 1.0 | 1.25 | 1.75 |
| −5 > err | 1.0 | 1.5 | 2.0 |

So configured, this method and systems configured to perform this method consistently produces a load step response that is under-damped and has a longer settle time than the response that targeted by manually tuning the loop. The peak disturbance in the regulated output voltage, however, appears to be as good as or better than what can be achieved using manual methods to do the tuning. By modifying the weights more heavily toward the RMS of the closed loop output impedance, the response can be more damped, which improves the settle time.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of automatically tuning a voltage regulation control loop for a digitally controlled switch mode power supply, the method comprising:
    determining a frequency response of a power stage of the digitally controlled switch mode power supply;
    calculating an open loop transfer function from the frequency response;
    dividing out a known controller loop compensation transfer function from the open loop transfer function;
    defining a correlated metric based at least in part on the open loop transfer function, the correlated metric correlated to an expected disturbance in regulated output voltage from the digitally controlled switch mode power supply due to a change in load;
    calculating new values for the open loop transfer function for a range of controller compensation parameters to minimize the correlated metric.

2. The method of claim 1 wherein the determining the frequency response comprises:
    exciting a control loop of the digitally controlled switch mode power supply by a digital controller with a series of synthesized sine wave signals, and
    sensing a response thereto with the digital controller, the response comprising the frequency response.

3. The method of claim 2 wherein sensing the response to the series of synthesized sine wave signals comprises:
    sampling a point in the control loop other than a point of excitation by the series of synthesized sine wave signals;
    multiplying a value at the point by a synthetic cosine sequence to obtain a first result and by a synthetic sine sequence to obtain a second result; and
    accumulating the first result and the second result.

4. The method of claim 1 wherein the determining the frequency response comprises:
    receiving power stage parameters;
    calculating the frequency response of the power stage from the power stage parameters.

5. The method of claim 1 wherein the determining the frequency response comprises:
    exciting the power stage when disconnected from a compensator by applying a series of synthesized sine wave signals combined with an average duty cycle of the power stage;
    sensing a response thereto with a digital controller, the response comprising a frequency response.

6. The method of claim 1 further comprising determining a plurality of open loop transfer functions by selecting a range of values for zeros of a controller compensator equation and determining a gain of the controller compensator equation at each instance of controller zeros.

7. The method of claim 1 further comprising:
    fitting the open loop transfer function to a second order transfer function using a least square system identification of the open loop transfer function;
    calculating a range for zeros based on dominant second order poles of the open loop transfer function;
    defining a basis for determining discrete-time filter coefficients using the range of zeros;
    determining a DC gain of the controller compensation parameters by setting a resulting open loop gain equal to 1.0 at a frequency that gives a desired phase margin.

8. The method of claim 1 wherein defining a correlated metric comprises simulating the digitally controlled switch mode power supply based on a least squares fit model of a power stage of the digitally controlled switch mode power supply and a selected compensator and capturing root mean square (RMS) and peak to peak disturbance of a regulated output voltage of the model to a load step.

9. The method of claim 1 wherein defining a correlated metric comprises evaluating a closed loop output impedance of the digitally controlled switch mode power supply.

10. The method of claim 9 where the correlated metric comprises a weighted sum of the closed loop output impedance at a minimum frequency measured, the closed loop output impedance at a frequency at which the open loop output impedance is a maximum, the closed loop output impedance at a frequency at which the open loop output impedance is a maximum, and a RMS of the closed loop output impedance over a range of frequencies at which the open loop output impedance is evaluated.

11. A digitally controlled switch mode power supply comprising:
a switch mode power supply converter;
a digital controller connected to receive an output of the switch mode power supply converter and to provide a controller signal to the switch mode power supply converter, and to determine a frequency response of the switch mode power supply converter, the digital controller configured to:
calculate an open loop transfer function from the frequency response;
divide out a known controller loop compensation transfer function from the open loop transfer function;
define a correlated metric based at least in part on the open loop transfer function, the correlated metric correlated to an expected disturbance in regulated output voltage from the digitally controlled switch mode power supply due to a change in load; and
calculate new values for the open loop transfer function for a range of controller compensation parameters to minimize the correlated metric.

12. The digitally controlled switch mode power supply of claim 11 wherein the digital controller configured to be in communication with an input and an output of a power stage of the switch mode power supply converter, wherein the digital controller is further configured to:
excite a control loop of the digitally controlled switch mode power supply with a series of synthesized sine wave signals, and
sense a response to the synthesized sine wave signals by the power stage, the response comprising the frequency response.

13. The digitally controlled switch mode power supply of claim 12 wherein the digital controller is in communication with a point in the control loop other than a point of excitement of the control loop wherein the digital controller is further configured to:
sample voltage values at the point;
multiply the voltage values at the point by a synthetic cosine sequence to obtain a first result and by a synthetic sine sequence to obtain a second result; and
accumulating the first result and the second result.

14. The digitally controlled switch mode power supply of claim 11 wherein the digital controller is further configured to:
receive power stage parameters;
calculate the frequency response of a power stage of the switch mode power supply converter from the power stage parameters.

15. The digitally controlled switch mode power supply of claim 11 wherein the digital controller configured to be in communication with an input and an output of a power stage of the switch mode power supply converter, wherein the digital controller is further configured to:
excite the power stage when disconnected from a compensator by applying a series of synthesized sine wave signals combined with an average duty cycle of the power stage;
sense a response thereto, the response comprising a frequency response.

16. The digitally controlled switch mode power supply of claim 11 wherein the digital controller is further configured to:
determine a plurality of open loop transfer functions by selecting a range of values for zeros of a controller compensator equation and determining the gain of the controller compensator equation at individual instances of controller zeros.

17. The digitally controlled switch mode power supply of claim 11 wherein the digital controller is further configured to:
fit the open loop transfer function to a second order transfer function using a least square system identification of the open loop transfer function;
calculate a range for zeros based on dominant second order poles of the open loop transfer function;
define a basis for determining discrete-time filter coefficients using the range of zeros;
determine a DC gain of the controller compensation parameters by setting a resulting open loop gain equal to 1.0 at a frequency that gives a desired phase margin.

18. The digitally controlled switch mode power supply of claim 11 wherein the digital controller is further configured to simulate the digitally controlled switch mode power supply based on a least squares fit model of a power stage of the digitally controlled switch mode power supply and a selected compensator and capturing RMS and peak-peak disturbance of a regulated output voltage of the model to a load step.

19. A controller for a switch mode power supply, the controller comprising:
a connector for receiving a voltage output from a switch mode power supply;
digital pulse width modulation circuitry configured to apply a pulse width modulated control signal to the switch mode power supply;
a processing unit operatively connected to the digital pulse width modulation circuitry;
a memory operatively connected to the processing unit;
wherein the processing unit is configured to:
determine a frequency response of the switch mode power supply;
calculate an open loop transfer function from the frequency response;
define a correlated metric based at least in part on the open loop transfer function, the correlated metric correlated to an expected disturbance in regulated output voltage from the digitally controlled switch mode power supply due to a change in load;
calculate new values for the open loop transfer function for a range of controller compensation parameters to minimize the correlated metric;
select a set of zeros for a controller compensator equation based on a phase margin for the switch mode power supply; and
determine a gain for the controller compensator equation based on the set of zeros for the controller compensator equation.

20. The controller of claim 19 wherein the processing unit is further configured to:
fit the open loop transfer function to a second order transfer function using a least square system identification of the open loop transfer function;
calculate a range for zeros based on dominant second order poles of the open loop transfer function;
define a basis for determining discrete-time filter coefficients using the range of zeros;
determine a DC gain of the controller compensation parameters by setting a resulting open loop gain equal to 1.0 at a frequency that gives a desired phase margin.

* * * * *